Aug. 29, 1944.  S. W. ALDERFER  2,356,964
LOOM
Filed Dec. 4, 1942  9 Sheets-Sheet 1
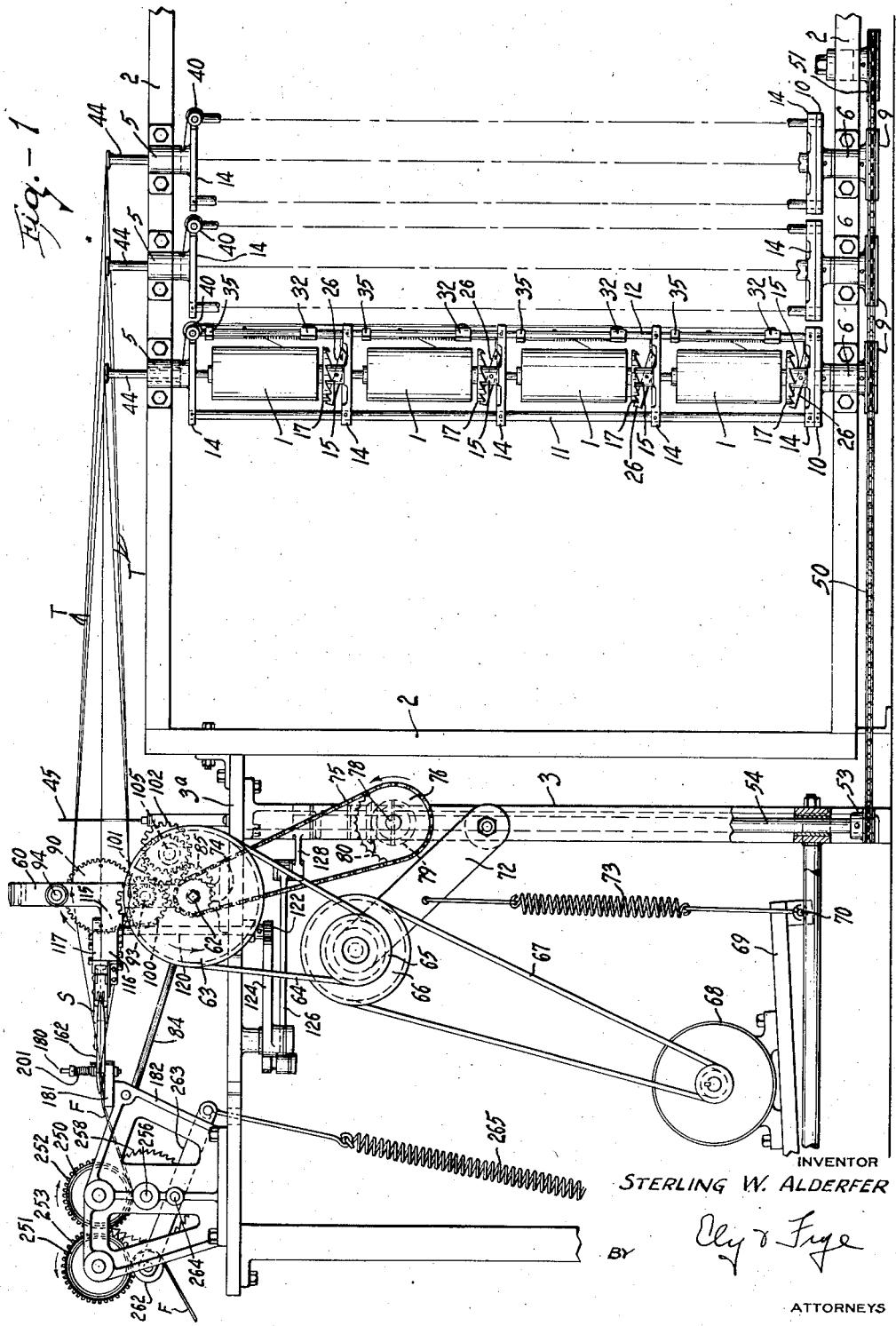
INVENTOR
STERLING W. ALDERFER
BY
ATTORNEYS Aug. 29, 1944.  S. W. ALDERFER  2,356,964
LOOM
Filed Dec. 4, 1942  9 Sheets-Sheet 2
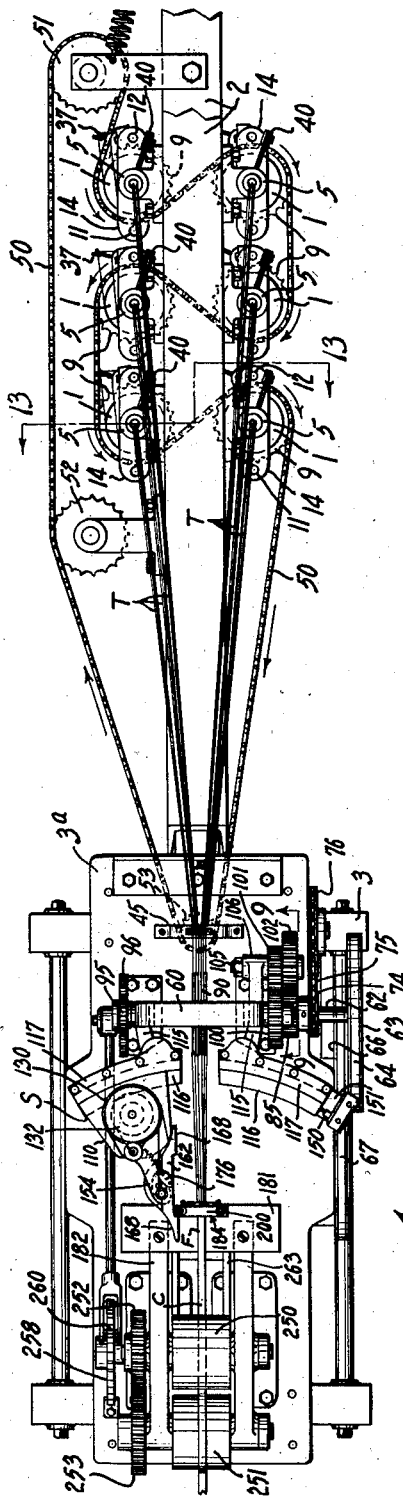
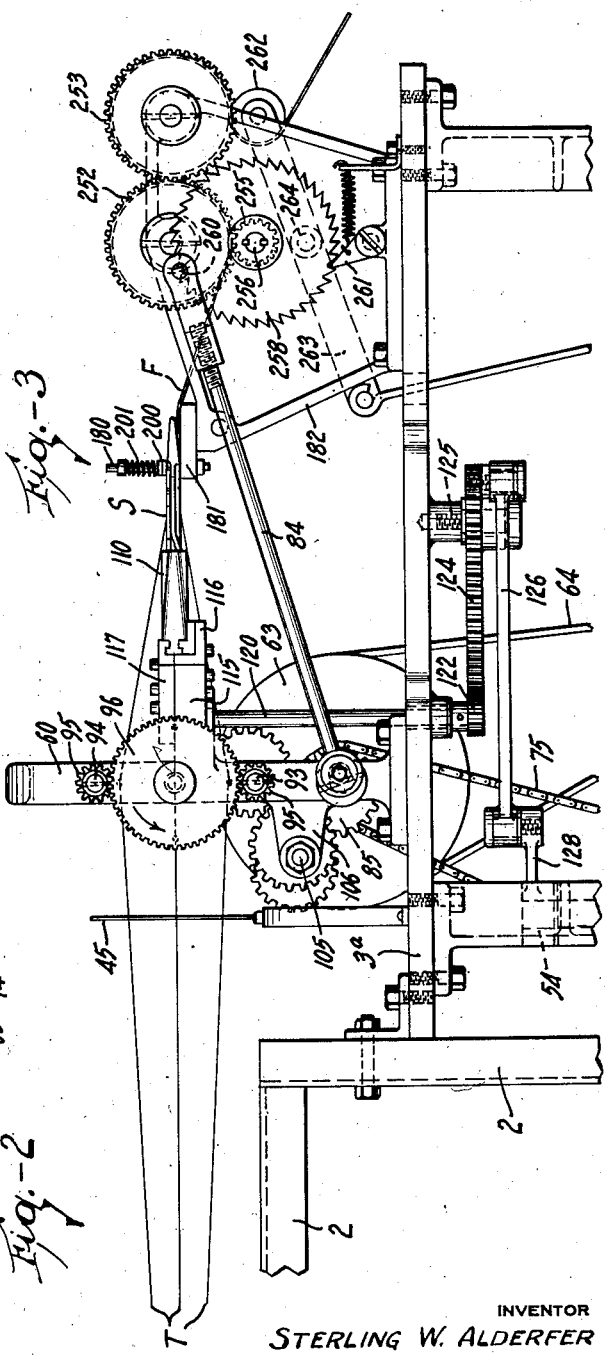
INVENTOR
STERLING W. ALDERFER
BY
ATTORNEYS Aug. 29, 1944. S. W. ALDERFER 2,356,964
LOOM
Filed Dec. 4, 1942 9 Sheets-Sheet 5

INVENTOR
STERLING W. ALDERFER

BY Ely Y Frye

ATTORNEYS

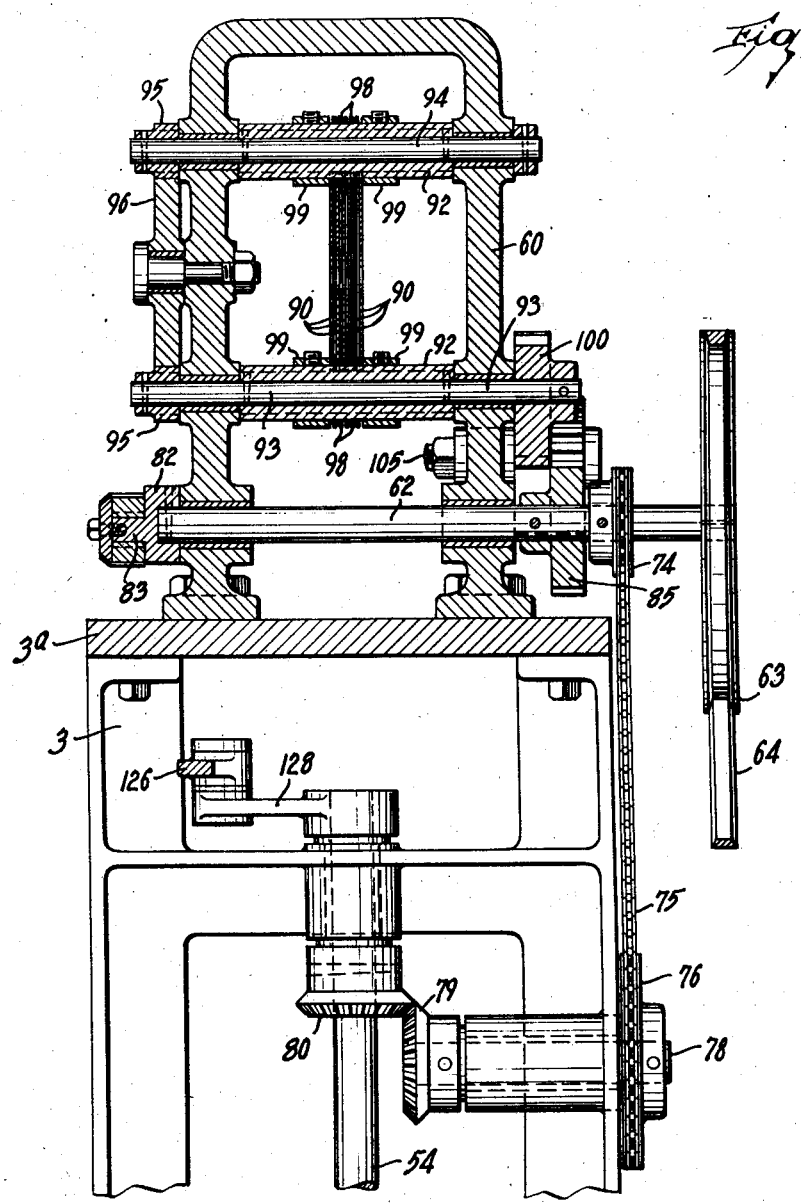

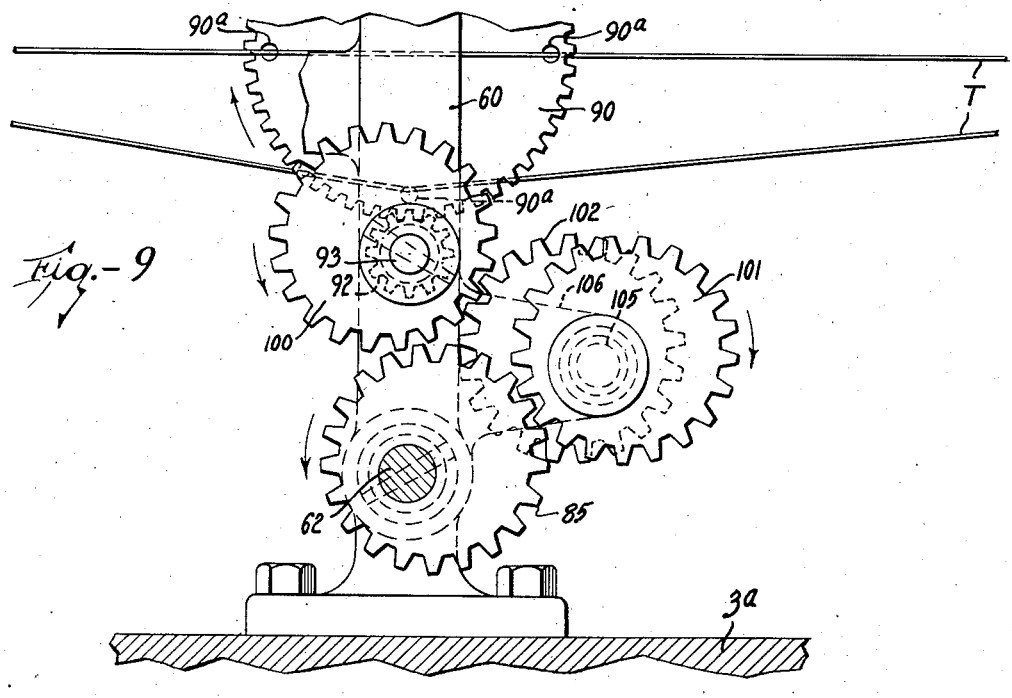

Aug. 29, 1944.　　　　S. W. ALDERFER　　　　2,356,964
LOOM
Filed Dec. 4, 1942　　　　9 Sheets-Sheet 8

INVENTOR
STERLING W. ALDERFER
BY
Ely & Frye
ATTORNEYS

Aug. 29, 1944.  S. W. ALDERFER  2,356,964
LOOM
Filed Dec. 4, 1942  9 Sheets-Sheet 9
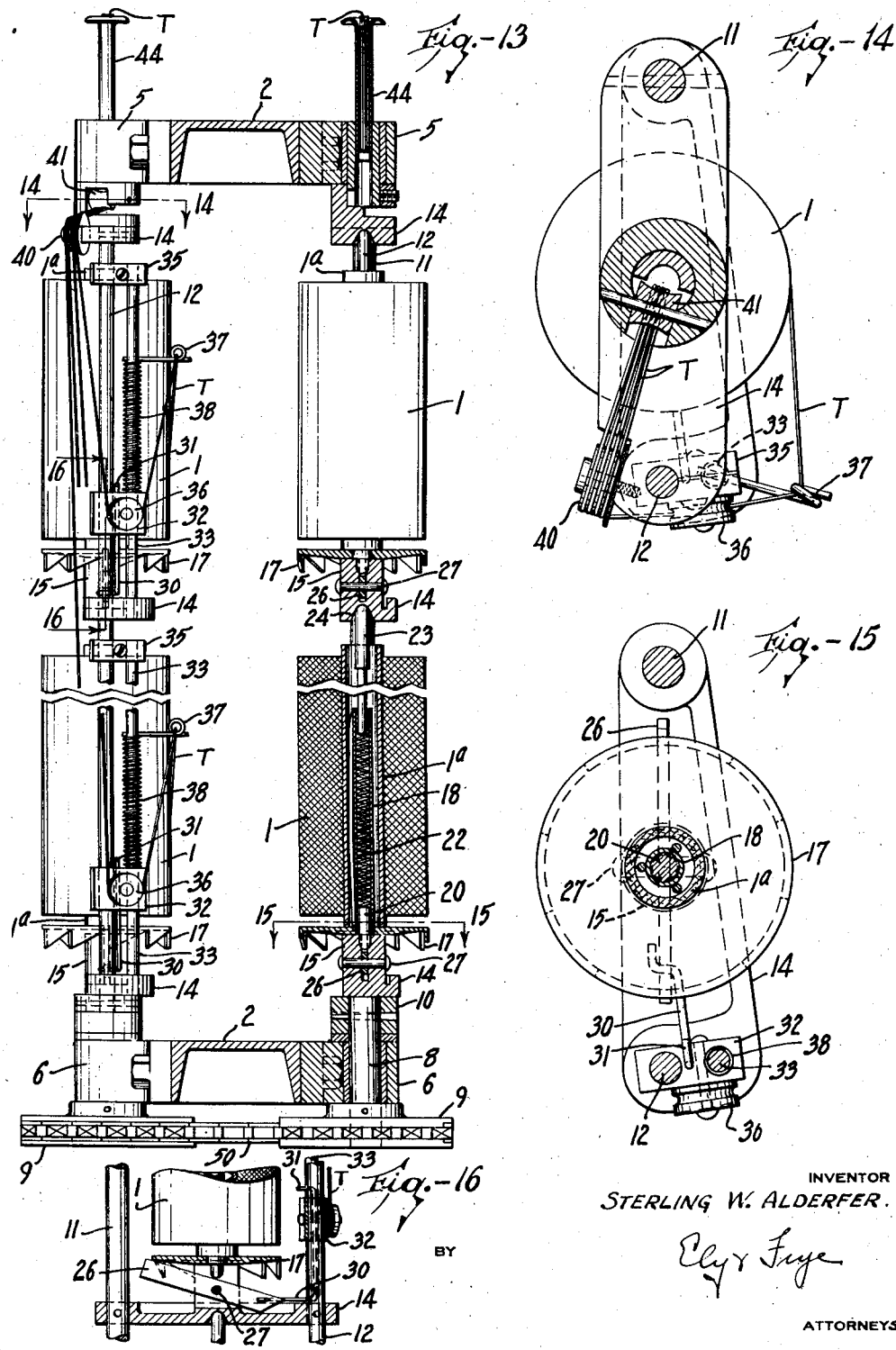
INVENTOR
STERLING W. ALDERFER.
BY
ATTORNEYS Patented Aug. 29, 1944

2,356,964

UNITED STATES PATENT OFFICE 2,356,964

LOOM

Sterling W. Alderfer, Akron, Ohio, assignor of one-half to Edward D. Andrews, Akron, Ohio Application December 4, 1942, Serial No. 468,169

40 Claims. (Cl. 139—11)

The present invention relates to looms particularly adapted for the manufacture of narrow fabrics such as tapes, belting, webbing or similar materials. The loom is based upon the principle of so-called "card" weaving, which is an old and well known method of weaving, and the object of the invention is to improve upon looms which operate upon this system of weaving. The improvements consist in the designing of a highly efficient and rapid loom which may be used economically in the manufacture of the types of fabrics specified. While this system or method of weaving has been known since prehistoric times, and while there have been patents granted upon looms operating upon this principle, so far as known to me no practical use has been made of these machines. The loom shown herein embodies many features of novelty which make this type of loom commercially practicable.

The fabric made upon a loom of this type has certain valuable properties due to the peculiar and distinctive formation of the woven fabric. In a loom of this type, parallel groups of warp threads of any desired number are passed through holes in "cards" or disks and as the disks are rotated, the threads of each group are twisted or cabled upon each other to form a series of parallel cables. During the cabling operation sheds are formed between the threads and a pick or filler thread is passed back and forth through the shed, and as a result the pick thread is woven through the center of the several parallel cables. There are, therefore, no knuckles in the resultant product such as found in a woven fabric in which the warps and filling threads cross. The cables or warp elements formed by the group of warp threads lie in the same plane throughout the fabric and the pick threads passing through the center of the several cables lie in the same plane throughout the fabric. The direction of cable twist in each warp element is determined by the direction in which the threads are passed through the cards, and by varying the direction in different cards, it is possible to obtain decorative patterns which may be enhanced by using different colored threads in each cable or in the several cables. It is desirable not to twist all of the cables in the same direction so that the opposing twists prevent any tendency of the fabric to curl.

It is possible, therefore, to attain many novel patterns or effects in tapes or fabrics made on this form of loom, and, in addition, the product is much stronger than similar products made by the ordinary weaving processes because the warp elements, being free of knuckles, are capable of imparting their maximum strength to the finished product.

There is no limitation except practicability on the number of warp elements which may be woven together in a loom of the type shown so that the resultant fabric may be of any width. In the loom illustrated herein, only six warp elements or cables are shown, but this is due to the advisability of simplifying the drawings. Also, while it is preferred to use only four threads or ends in a single cable, due to the necessity of providing sufficient space for the passage of the shuttle, it is possible to use more or less threads to form each cable.

In weaving of this type, the twist which is imparted to the threads of each cable appears on both sides of the cards, i. e., at the weaving point and between the cards and the spools. One of the important and valuable features of the invention is the provision to eliminate the twist on the feeding side of the cards so that the threads will not be twisted at the supply. This result is accomplished by rotating the group of spools which feed the threads for each cable in the direction required to remove the twist from the supply end of the loom at the same rate at which it is put into the cables at the weaving point.

It is also one of the novel features of the invention to provide new and improved means for mounting the cards or disks so that they may be more easily threaded and adjusted. It is also a feature of the invention to rotate the disks at variable speeds so as to allow the maximum time for the passage of the shuttle through the shed and yet not slow down the productive speed of the loom.

As a further feature of novelty and improvement, the loom is provided with a new and efficient type of shuttle with which is combined a novel and efficient beater to align the pick thread across the fabric.

The loom contains other features of novelty and improvement which will appear from the detailed description of the preferred form of the invention which is shown in the drawings and described in the specification. It will also be evident that the loom may be altered or modified without departing from the spirit and scope of the invention as set forth in the appended claims.

In the drawings in which the best known and perfected form of the invention is disclosed:

Fig. 1 is a side elevation of the complete loom structure, the creel or spool holder being shown at the right. As the drawings show only a six-cable fabric, the showing of the creel is confined to a creel which will supply six cables of four threads or ends each.

Fig. 2 is a plan view of the parts shown in Fig. 1.

Fig. 3 is an enlarged side elevation of the weaving unit and take off, this view being taken of the side opposite to that shown in Fig. 1.

Figure 6:
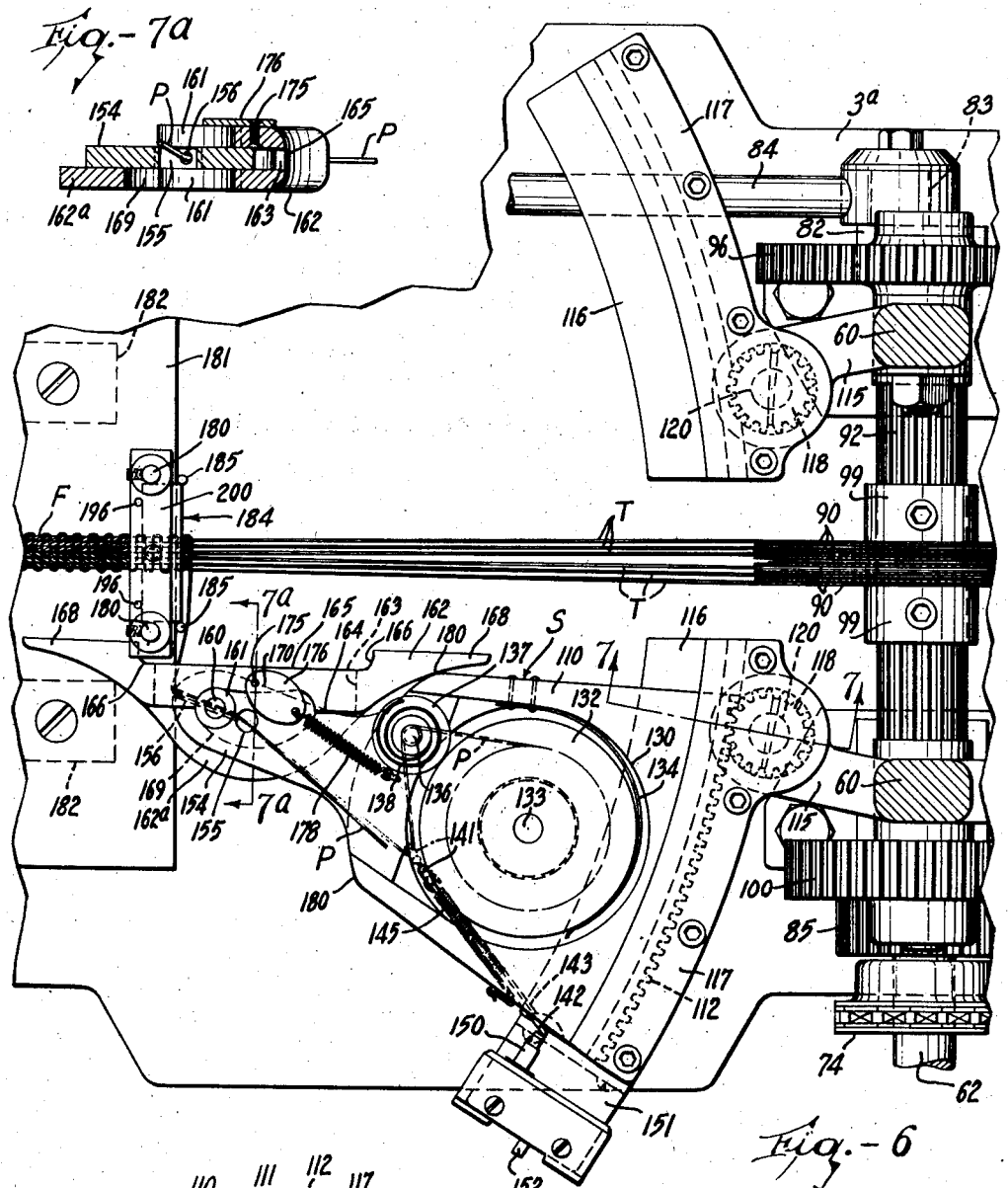
Fig. 6 is an enlarged plan view of the shuttle at one of its extreme positions.
Figure 7:
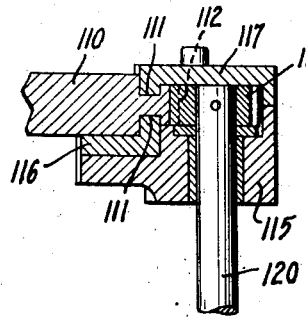
Fig. 7 is a detail section on the line 7—7 of Fig. 6.

Fig. 7ᵃ is an enlarged section through the beater on the line 7ᵃ—7ᵃ of Fig. 6.

Figure 4:
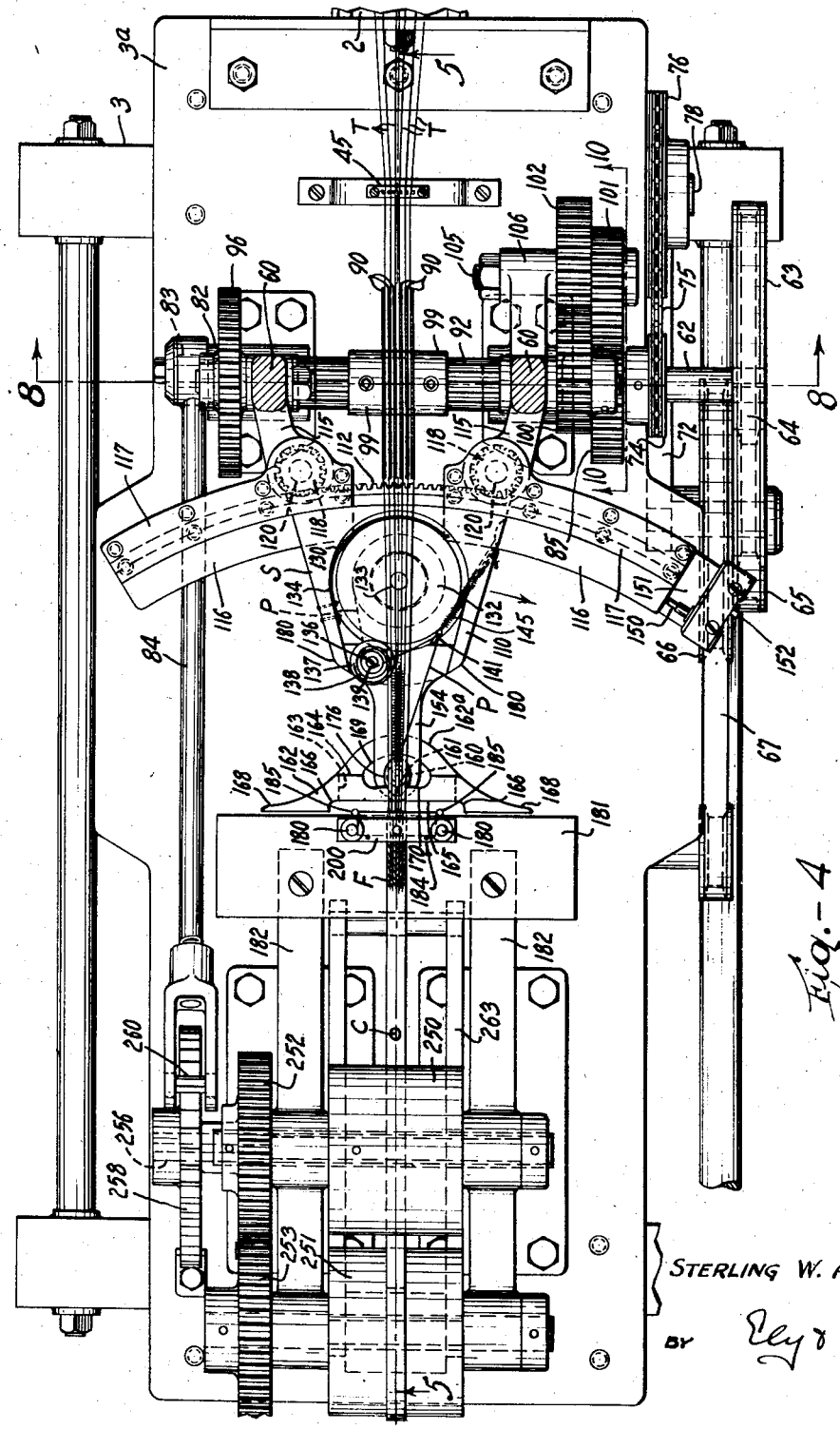
Fig. 4 is an enlarged plan view showing the parts illustrated in Fig. 3 with the shuttle at its midway point.

Fig. 8 is a vertical section through the cards or disks on the line 8—8 of Fig. 4.

Fig. 9 is a section on the line 9—9 of Fig. 2, showing the position of the drilvng gears while the cable is being formed, at which time the cards are rotating at their top speed.

Fig. 10 is a similar view showing the position of the driving gears when the shed is at its maximum and the cards are rotating at their low speed.

Figure 5:
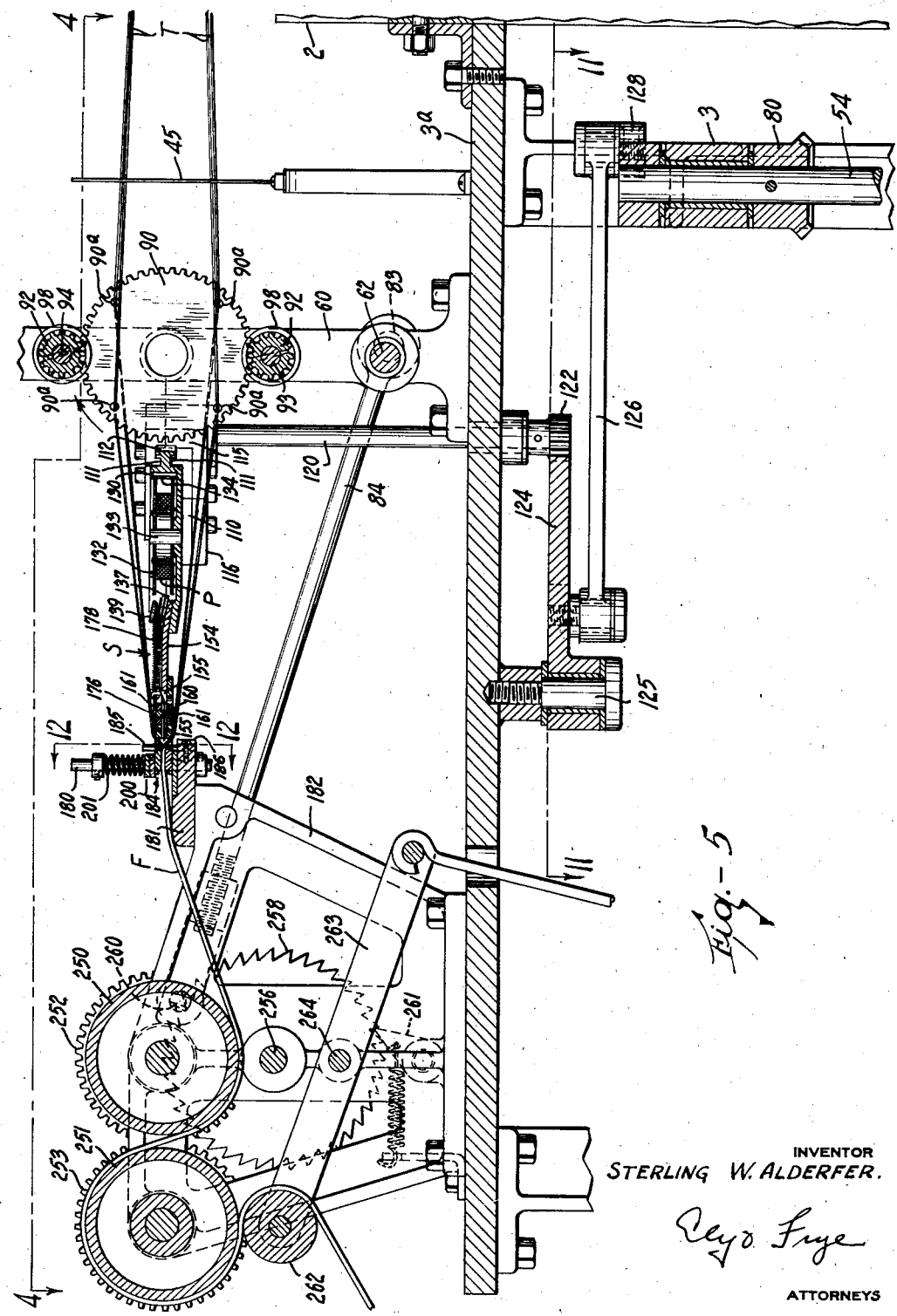
Fig. 5 is a vertical section on the line 5—5 of Fig. 4.
Figure 11:
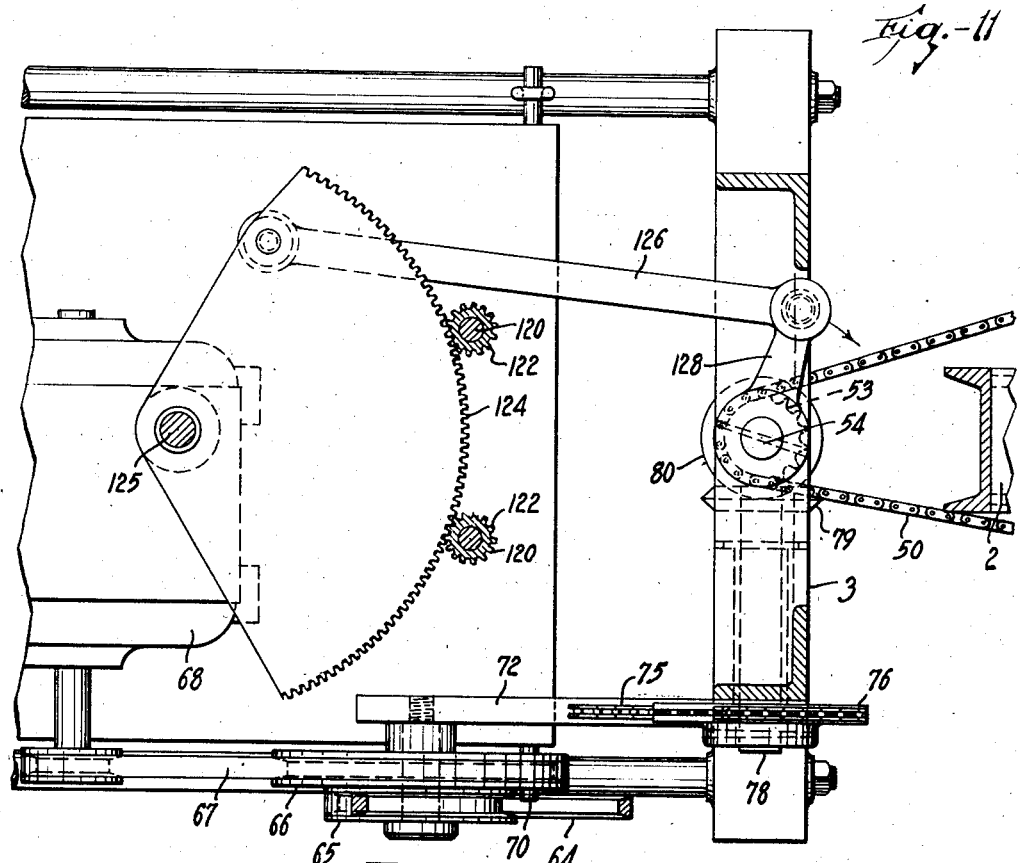

Fig. 11 is a section on the line 11—11 of Fig. 5 showing the shuttle driving sector and its operating mechanism.

Figure 12:
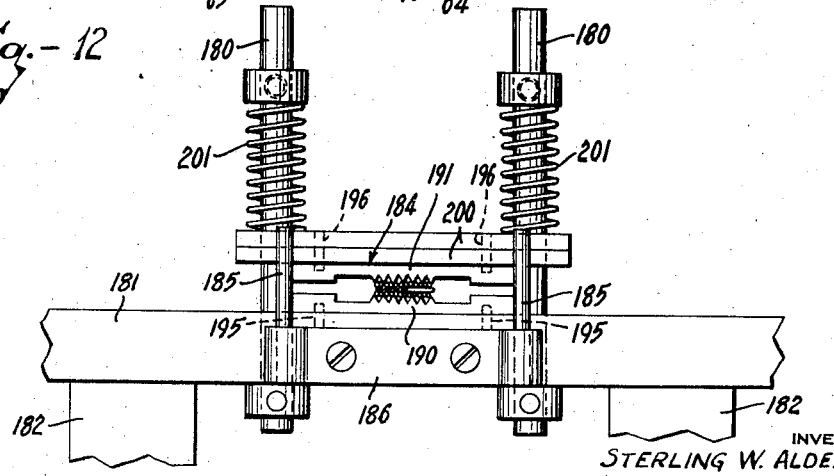

Fig. 12 is a section on the line 12—12 of Fig. 5.

Fig. 13 is a section on the line 13—13 of Fig. 2, showing one of the stanchions for supporting the spools.

Figs. 14 to 16, inclusive, are sections on the lines 14—14, 15—15 and 16—16, respectively, of Fig. 13.

Spool supports

As explained heretofore, the operation of the cards puts a twist in the several threads which constitute a single cable on both sides of the cards, and one of the features of the invention is the arrangement by which the spools of each group which constitute a single cable are rotated to remove the twist on the feeding side of the cards. In the form of the invention shown herein, the cables are composed of four threads or ends and each group of ends is drawn from four spools 1 which are mounted in vertical alignment in a rotating frame 2 attached to the frame 3 of the loom. The groups of spools are arranged in pairs upon opposite sides of the frame 2 by upper and lower brackets 5 and 6. The lower brackets 6 constitute bearings in which are mounted the spool frame driving shafts 8 to the lower end of which are attached the drive sprockets 9. To the upper end of each drive shaft is secured a plate 10 from which extend the vertical posts 11 and 12 which constitute the stanchions or frames in which the spools are mounted. Distributed along the posts 11 and 12 are the spool supports 14 which are in the form of plates each of which is provided with a central bearing sleeve 15 on which the spool escapement disk 17 is rotatably supported.

From the top of each disk 17 extends the ribbed spindle 18 over which the core 1ᵃ of the spool is fitted, and in the lower end of the spindle is located a rounded pin 20 which fits within a socket in the top of the sleeve 15. A light coil spring 22 is located in the spindle and carries a plunger 23 which fits within a socket 24 in the next adjacent spool support 14. The spools may be replaced by depressing the plunger 23 and tilting the spindle. The underside of each disk 17 is provided with ratchet teeth which are engaged by the detent 26 pivotally mounted on a pin 27 mounted in the spool support. This latch or detent 26 is operated to release the disk 17, so that the spool may rotate to feed the thread, by the light trigger 30 which has a vertical arm passing through the slide 32 and terminating in a hooked end 31. The slide 32 is vertically movable on the post 12 and upon a secondary post 33 mounted at its lower end in the part 14 and in its upper end in a bracket 35 attached to the post 12.

On the slide 32 is mounted the roller 36 under which the thread T passes after it leaves the eye 37 formed at the end of a wire attached to the post 33. Between the eye and the slide is arranged the light coil spring 38. As the thread T is withdrawn, the slide 32 rises until the trigger 30 is lifted, permitting the spool to rotate to release a new supply of thread to the loop formed by the roller 36. This is a standard form of feeding escapement and its operation is well known.

The four threads or ends T from the spools in each stanchion are led over a grooved pulley 40 located on the uppermost cross-plate 14 and thence over a second guide roller 41 mounted upon the plate 14 which delivers the group of ends to the guiding tube 44 mounted in the frame 2 at the axis of the spool stanchion. From the several guiding tubes the groups of threads pass through a separating comb 45 mounted on the top of the bed plate 3ᵃ of the loom and thence to the cards.

In order to remove the twist at the spools, the several sprocket gears 9 are rotated by means of a chain 50, the path of which is outlined in Fig. 2. This chain passes around each sprocket so as to impart rotation to each stanchion in the direction required to remove the twist placed in the group of threads by the operation of the cards. If the threads pass through the cards from left to right, a twist in one direction will be imparted to those threads, while if the threads pass through the cards from right to left, the twist will be in the opposite direction. In the tape or fabric F illustrated in Figs. 4 and 6, a herringbone effect has been given by twisting the three cables constituting one-half of the tape in one direction and the three cables constituting the other half of the tape in the opposite direction, it being noted that in the drawings the threads of the groups issue from opposite sides of their respective disks or cards. For this reason the stanchions on the upper side of Fig. 2 are all rotated in one direction, while the stanchions on the lower side of this view are all rotated in the opposite direction, and the path of the chain is laid out to give this particular rotational movement to the stanchions. It is apparent that as the direction of twisting in the several cables is altered by the direction of threading the disks, the direction of rotation of the stanchions will be altered by changing the path of the chain 50. If the twists were alternated in any other way, the path of the chain would be changed to suit the varied conditions.

The chain 50 passes over the spring-held tightening sprocket 51, over the idler 52 and over the driving sprocket 53 mounted on the vertical shaft 54 in the frame of the loom and driven from the card driving means so that the speed of rotation of the spool stanchions will move the twist between the spools and the cards at the same rate at which the twist is put into the cables beyond the cards.

Loom driving mechanism

Referring to Fig. 8, on the bed plate 3ª of the loom are secured the vertical legs of the U-shaped standard 60 in the lower portion of which is located the main horizontal driving shaft 62 to one end of which is attached the pulley 63 which is driven by belt 64 from the smaller pulley 65 attached to a companion pulley 66 to which power is applied by belt 67 from the motor 68 (Figs. 1 and 11). In order to maintain tension on the belting, the motor is mounted upon the platform 69 which is pivoted on a rod 70 extending across the frame of the loom, and the pulley 65—66 is mounted on the end of a rocking arm 72 which is urged downwardly by a spring 73, the lower end of which is attached to the rod 70.

On the shaft 62 is located the sprocket 74 which is connected by chain 75 to a sprocket 76 on the countershaft 78 located in the loom frame and having at its other end a bevel gear 79 which engages the bevel gear 80 fixed to the vertical shaft 54 which drives the spool stanchions. The upper end of the shaft 54 drives the shuttle, as will be described.

At the far end of the shaft 62 is fixed the crank-head 82 formed with the crank pin 83 which actuates the pitman 84 for driving the take off rolls. Also fixed to the shaft 62 is the eccentrically mounted gear 85 which drives the cards through the gearing to be described in connection with the next section of this specification.

The cards

The cards are in the form of thin sheet metal disks 90, equal in number to the number of stanchions or groups of threads or ends, each group of which forms a single cable. The disks are placed side by side and are driven by their outer peripheries and each disk is provided with holes 90a equal in number to the number of threads or ends T which are formed in a cable. The threads of each group are passed through their disk in the direction determined by the direction of the twist desired in the cable. As the disks rotate, the ends or threads of each group will be spread apart in pairs to form a passage or shed, as shown in Fig. 5, through which the shuttle may be passed. During this portion of the rotation of the cards, the movement of the cards is slowed down by the gearing to be described, so as to allow more time for the passage of the shuttle. During the next quarter turn of the cards, the ends will be twisted and a new shed formed. During the twisting operation, the cards are moved at an accelerated speed to increase the productivity of the loom. The position of the cards at the midway point in the twisting is shown in Fig. 3. As the rotation continues and a new shed is formed, the pick is passed through the shed in the return direction. By the arrangement shown, the picks are located between each twist in the cables, and the shuttle throwing mechanism is designed to accomplish this result, but it would be obvious that by redesigning, the shuttle-operating mechanism may be run so as to space the picks further apart and permit any number of twists to be formed between picks.

In the loom as shown, the cards are placed equidistantly and close together so that the tape is closely woven, but it is possible to adopt any spacing which may be desired to create an open fabric.

The cards, six of which are shown, are indicated at 90 and in the present showing are provided with four holes 90ª spaced 90° apart and located near the periphery of the disks. The rims of the disks are formed with gear teeth which mesh with elongated gear teeth formed on sleeves 92, the lower sleeve being secured to a shaft 93 extending through the standard 60 and the upper to the parallel shaft 94. Ends of the shafts 93 and 94 carry pinions 95 which are connected by the idler pinion 96 mounted on the side of the standard 60. The geared sleeves 92 are of sufficient length to accommodate any desirable number of disks and retain the disks in their positions and drive them in the direction of the arrow in Fig. 5. The disks are spaced apart by loose rings 98 and held in position laterally by the locking collars 99.

The disks are held by the two gear sleeves 92 at diametrically opposite points and can be easily removed for threading. There is no tendency for the disks to get out of place during the operation of the loom.

The disks are driven at the uneven speed described from the eccentric gear 85 through the gearing shown in Figs. 9 and 10. Secured to the end of the shaft 93 above the gear 85 is an eccentric gear 100. The gear 85 meshes with an eccentric idler gear 101 and the gear 100 with an eccentric idler gear 102. The gears 101 and 102 are fixed together and rotate on a shaft 105 mounted on a bracket 106 formed as a part of the standard 60. When the shed is formed, as shown in Fig. 10, the short radius of the gear 85 is in line with the long radius of the gear 101 and the short radius of the gear 102 is in line with the long radius of the gear 100, which will impart the slow speed to the disks or cards 90 while the shuttle is passing through the shed to lay the pick therein. Conversely, when the twisting of the ends occurs, as in Fig. 9, the position of all the gears is reversed which accelerates the rotation of the disks or cards, this operation occurring while the shuttle is at the ends of its travel.

The shuttle and beater

The shuttle, indicated generally at S, comprises a substantially sector-shaped plate 110 which moves in an arcuate path back and forth through the shed about a center point C located at some distance beyond the weaving point (Fig. 4). On its curved periphery the plate 110 is provided with upper and lower grooves 111 and with gear teeth 112 by which it is guided and driven in its required path. On either side of the standard 60 there is provided a bracket 115 and to the two brackets are secured the arc-shaped rails 116 which engage the groove on the under side of the plate 110. Over each bracket is fastened the rail 117 which engages the groove on the upper side of the plate 110. The rails 116 and 117 are located on opposite sides of the passage for the threads as they leave the cards and the shuttle is of sufficient extent so that it will engage either or both of the guides at all times. Set within a recess formed in each bracket 115 and upper rail 117 is a shuttle driving gear 118 which engages the gear teeth 112 on the periphery of the shuttle plate. Each gear 118 is secured to the upper end of a shaft 120 rotatable in a bearing in the bracket 115 and extending through the bed plate 3ᵃ. To the lower end of these shafts 120 beneath the bed plate are secured the gears 122, which are engaged and driven by the sector gear 124 which rocks upon the stub-shaft 125 depending from the underside of the bed plate 3ᵃ.

The oscillatory motion which is required to throw the shuttle from one side to the other of the group of threads is imparted to the gears 122 by a link 126 attached to the sector gear 124 and to the crank 128 on the upper end of the vertical shaft 54. The operation is timed so that the shuttle is free of the threads during the twisting movement and will pass across the gap when the threads are in the position shown in Fig. 5. The drive mechanism is designed to throw the shuttle during each 90° movement of the cards but the mechanism can be so designed as to throw the shuttle at longer intervals to permit any extent of twisting desired between the pick threads.

The upper surface of the shuttle plate 110 is formed with a recess 130 in which the spool 132 containing the pick-thread P is located, the spool being mounted on a pin 133 set in the plate 110. The pick thread may be a single or multiple thread as desired. A light flat spring 134 is secured in the recess 130 and bears upon the rims of the spool so as to restrain its unwinding movement. The thread P, as it leaves the spool, passes around a pin 136 and between two light friction disks 137, pressure upon which is maintained by a light coil spring 138 adjusted by the turn button 139. Thence the thread P passes through an eye 141 formed on the end of a rod 142 slidably mounted in a passage 143 formed in the plate 110. The rod is urged toward the rear of the shuttle by a light coil spring 145 attached to the rod and the shuttle plate. During the normal operation of the loom the pull on the thread P will retract the pin 142 but when the supply of pick is exhausted, or should it break, the pin 142 will be pulled by the spring to the position shown in Fig. 6 where it strikes a safety switch 150 mounted on an extension 151 of one bracket 115 and the circuit to the motor is broken, stopping the loom. A reset switch 152 is provided to close the circuit to the motor when it is desired to start the loom.

To the inner end of the plate 110 is attached an extension 154 the outer end of which is round-pointed. Near the end of this extension is a hole 155 and from this hole and terminating at the point of the shuttle is a passage 156 through which the thread P is conducted to the weaving point.

Between the hole 155 and the point of the shuttle is pin 160 which extends above and below the extension and rotatably supports two ring washers 161 about which the beater arm 162 rocks and shifts during the operation of the shuttle. This beater arm is in the form of a plate of the peculiar shape illustrated in Fig. 6 and is provided with a long centrally located slot 163 in which the nose of the shuttle extension 154 is received and through which the thread P passes. The upper side of the beater arm is cut back along a line 164 which substantially bisects the pin 160 so that the beater arm does not interfere with the pick thread. On the opposite side the beater arm is provided with a rounded edge 165 set back from the face of the beater and of somewhat greater extent than the slot 163. This rounded face contacts the picks and forces them into their correct position across the tape. At the extremities of the beater surface 165 the beater plate is formed with the two curved surfaces 166 which constitute the fulcrums about which the beater is rotated. The extremities of the beater are shaped as elongated rounded horns 168 so as to facilitate the movement of the shuttle and the beater carried by it through the shed. In the lower arm 162ᵃ of the beater is located the kidney-shaped slot 169 which is received over the lower ring washer 161, while the edge 164 is cut away to form a surface 170 which corresponds with the forward edge of the slot 169 and bears against the upper ring washer 161. It will be noted that the surface 170 and the corresponding wall of the slot 169 are arched slightly so that the ring washer will tend to move to the extremities of the slot 169.

On the central line of the beater and near its forward edge is a pin 175 on which is located a light pivoted plate 176 the opposite end of which is attached to a coil spring 178 connected to the shuttle extension. The function of this spring is to throw the beater arm to the limits of its movement in either direction which is determined by the beater arm striking the side of the shuttle at 180 and the travel of the ring washer to the ends of the slot 169. It will be understood that the beater arm not only rocks but travels to the full extent permitted by the slot 169, the slight hump in the forward wall of the slot not only facilitating its movement but also determining the position of the beater when the shuttle is in its midway position as shown in Fig. 4.

The throwing of the beater in either direction of shuttle movement is performed by the shoulder 166, to the left as shown in Fig. 6, striking the pin 180 rising from a cross plate 181 attached to the bracket 182 at the delivery end of the loom. On the return movement the other shoulder strikes a similar pin 180 on the opposite side of the loom. These pins are located at opposite sides of the weaving point and support the spacer and guiding plate 184 to be described. The transverse movement of the shuttle causes the beater arm to rock about the pin 180 until the forward edge of the beater strikes auxiliary pins 185 which are in alignment across the tape and are secured to the forward edge of the cross-plate 181 by a clamp 186. As the beater enters the shed behind the pick it will force the pick into position across the tape, the position of the pick being determined by the distance between the forward edge of the beater and the forward wall of the slot 169 which bears against the roller washers 161.

If it is desired to omit the pick thread at any time or for any period of operation the beater is useful in aligning the twists in the warp threads.

From the weaving point the fabric or tape F which has now been formed passes through the throat of the spacer and guiding plate 184 (Fig. 12). This plate consists of a lower plate 190 and an upper plate 191 which are formed on their opposing faces with a series of teeth which form guides for the several cables and hold them in their proper position. The number and spacing of the teeth is determined by the number and spacing of the cables in the finished tape. The lower plate 190 is fixed by dowels 195 in the cross plate 181 and the upper plate by dowels 196 in a sliding pressure plate 200 mounted on the pins 180 and forced downwardly by the springs 201.

Take off mechanism

After the complete fabric or tape F leaves the spacer and guiding plate 184 it passes around the two take off rolls 250 and 251 which are rotatably mounted in the brackets 182 and are connected by the intermeshing gears 252 and 253. The gear 252 is in mesh with a driving pinion 255 fixed on the shaft 256 also mounted in the bracket 182. On the end of the shaft 256 is fixed the feed ratchet 258 which is engaged and driven by the pawl 260 on the end of the reciprocating link 84 previously described. This serves to advance the tape after each pick thread is laid in place. To prevent backward movement of the take off rolls a light detent pawl 261 is provided for the ratchet 258.

From the roll 251 the tape passes around the idler roller 262 mounted on the end of the lever 263 pivoted in the bracket at 264 and attached at its other end to a coil spring 265 which serves to take up any slack in the tape and insure feeding contact with the rollers 250 and 251. The surfaces of the rollers 250, 251 and 262 may be roughened for insuring positive advancement of the tape.

Résumé

The groups of threads constituting the cables or warp elements in the completed fabric are led from the spools to the several cards 90 where each individual thread of a group is passed through one of the holes in the card. The rotation of the cards twists the several threads into the individual cables, but while the threads are spread apart in the two groups the shuttle is passed through the shed laying the pick in the center of each cable. The beater enters the wide part of the shed and moves toward the weaving point moving the pick to its proper position by the rocking movement imparted by the rolling of the beater around the pins 180 and 185. As the shuttle moves across the center line of the loom the beater will drag somewhat owing to the contact with the warp threads until the pin 175 is past the center line of the shuttle whereupon the beater will be moved to its opposite extreme position. Figs. 2, 4 and 6 show the shuttle and beater in the extreme position on one side of the loom, at the center, and at the other side.

The twist which is imparted at the weaving point is removed at the creel by the rotation of the spool stanchions through the chain 50. The operation of the machine is greatly enhanced by the fast and slow rotation of the cards during the twisting and pick laying operations. This differential rotation is of great importance for it provides a sufficient interval to insure the passage of the shuttle. The beater not only lays the pick across the fabric in the required way but opens up the shed for the passage of the shuttle.

This loom is adapted for weaving a wide variety of materials, and by varying the directions of the twisting and by using different colored threads a wide variety of decorative effects may be secured. The strength of the tape is greatly enhanced by the fact that the warp threads are held in position by picks which pass through the center of the twisted cables.

While the description has been detailed in order to explain the invention in its best known and preferred form, the details need not be followed but may be altered within the scope of the invention as set forth in the appended claims.

What is claimed is:

1. In a fabric loom of the type described, a plurality of parallel cards having passages for warp threads near their outer peripheries, a creel comprising a plurality of spools, means for guiding a plurality of warp threads from the creel to each card, means for rotating the cards, and means for removing the twist placed in the threads between the cards and the creel by the rotation of the cards while maintaining tension on the warp threads.

2. In a loom of the type described, a plurality of parallel cards having passages for warp threads located near their outer peripheries, a creel, stanchions in the creel, spools located in the stanchions from which the warp threads are fed to the cards, means for rotating the cards, and means driven in positive timed relation to the speed of rotation of the cards for rotating the stanchions to remove the twist which would be imparted to the threads between the cards and the creel said stanchions being so arranged as to maintain tension in the threads during the rotation of the cards.

3. In a loom of the type described, a plurality of parallel cards having holes near their outer peripheries through which individual warp threads are passed, means to rotate the cards, a holder for a group of spools equivalent to the number of holes in each card, a guide having a fixed thread feeding point located between the spools and the card to conduct the threads from the spools and through the guide to the respective cards, and means to rotate the holder in the direction and at the speed required to offset the twist in the threads of each group of threads between the cards and the spools.

4. In a loom of the type described, a plurality of parallel cards having holes near their outer peripheries through which individual warp threads are passed, means to rotate the cards to twist the threads into cables beyond the cards, means to lay a pick through the cables during the twisting operation, spools from which the threads are fed to the cards, and means to offset the twist in the groups of threads constituting the cables on the feeding side of the cards, said last named means comprising a plurality of rotary supports for spools which supply the threads for the several cards, means for leading each group of threads to a point in alignment with the axis of the support means to maintain tension in the threads and means for rotating the several supports in the direction required to counteract the twist.

5. In a loom of the type described, a plurality of parallel cards having holes near their outer peripheries through which individual warp threads are passed, means to rotate the cards to twist the threads into cables beyond the cards, means to maintain tension on the threads during the twisting operation means to lay a pick through the cables during the twisting operation, spools from which the threads are fed to the cards, and means to offset the twist in the groups of threads constituting the cables on the feeding side of the cards, said last named means comprising a plurality of stanchions, each stanchion holding a number of spools equal to the number of threads in each cable, means to conduct the several threads to a delivery point in alignment with the axis of the stanchion and means to rotate the stanchion in the direction and at the speed required to offset the twist.

6. In a loom having a rotary card provided with a plurality of holes therein, a thread supply for the card comprising a rotary support, a group of spools on the support, means to lead the threads from the spools of said group to a delivery point, means to maintain tension on the threads during the rotation of the card, and means to rotate the support in the direction and at the speed to offset twisting of the threads by the rotation of the card to which the threads are supplied without altering the tension of the threads.

7. In a loom having a rotary card having a plurality of holes therein, a thread supply for the card comprising a rotary support, means on the support to supply a plurality of threads, means to lead the threads to a fixed delivery point, means to maintain tension on the threads during the rotation of the card, and means to rotate the support in a direction and at a speed to offset twisting of the threads between the delivery point and the card.

8. In a loom having a rotary card having a plurality of holes therein, means to supply a plurality of warp threads which are passed through the holes in the card, means operable in positive timed relation to the rotation of the card to offset the twist imparted to the threads between the card and the supply means and means to maintain tension on the threads during the twisting operation.

9. In a loom having a plurality of parallel rotary cards, each card having a plurality of holes therein, a creel having a plurality of spools to supply warp threads which are passed through the holes in the cards, means to rotate the cards, means operated in positive timed relation to the rotation of the cards to rotate the spools for removing the twist imparted to the threads between the cards and the creel and means to keep the threads under tension during the twisting operation.

10. In a loom having a rotary card having a plurality of holes therein, means to supply a plurality of warp threads which are passed through the holes in the card, means operable in timed relation to the rotation of the card to offset the twist imparted to the threads between the card and the supply means, means for maintaining tension in the threads, and a pick laying device movable between the threads on the delivery side of the card.

11. In a loom having a plurality of parallel rotary cards, each card having a plurality of holes therein, a creel having a plurality of spools to supply warp threads which are passed through the holes in the cards, means to rotate the cards, means operated in positive timed relation to the rotation of the cards to rotate the spools for removing the twist imparted to the threads between the cards and the creel means to keep the threads under tension during the twisting operation, and a pick laying device movable between the threads on the delivery side of the cards.

12. In a loom having a plurality of parallel rotary cards, each card having a plurality of holes therein, means to supply a plurality of warp threads which are passed through the holes in the cards, means operable in timed relation to the rotation of the cards to offset the twist imparted to the threads between the cards and the supply means, a pick layer, and a beater movable through the shed formed between the threads on the delivery side of the cards.

13. In a loom having a plurality of parallel rotary cards, each card having a plurality of holes therein, a creel having a plurality of spools to supply warp threads which are passed through the holes in the cards, means to rotate the cards, means operated in timed relation to the rotation of the cards to rotate the spools for removing the twist imparted to the threads between the cards and the creel, a pick layer, and a beater movable through the shed formed between the threads on the delivery side of the cards.

14. In a loom of the type described, a plurality of disks arranged in parallel relation, the rims of the disks being formed with teeth, holes in the disks through which the warp threads are passed, and means to support and rotate the disks comprising parallel shafts formed with elongated gear teeth engageable with the teeth of the disks and spacing collars receivable over the shafts between the disks.

15. In a loom of the type described, a plurality of disks arranged in parallel relation, holes near the periphery of the disks through which warp threads are passed, means to rotate the disks to impart a cable twist to the several threads from each disk, means to collect the cables in parallel relation, means to tighten and align the twists in the several cables comprising a beater, and means to pass the beater through the shed formed by the threads during rotation of the disks.

16. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, a beater on the shuttle, and means to pass the shuttle and beater through the shed formed by the threads during rotation of the disks, said disk rotating means having mechanism therein to retard the rotation of the disks during the passage of the shuttle and beater through the shed.

17. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, and means to pass the shuttle through the shed formed by the threads during the rotation of the disks, said disk rotating means including a variable speed drive which will accelerate the speed of rotation of the disks during the twisting interval.

18. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, and means to pass the shuttle through the shed formed by the threads during the rotation of the disks, said disk rotating means including a variable speed drive which will accelerate the speed of rotation of the disks during the twisting interval and reduce the speed of rotation of the disks while the shuttle is passing through the shed.

19. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, means to pass the shuttle through the shed formed by the threads during the rotation of the disks, a beater arm, and means to move the beater across the fabric and through the shed to tighten the twists and align the pick laid in the shed by the shuttle.

20. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, means to pass the shuttle through the shed formed by the threads during the rotation of the disks, a beater arm carried by the shuttle, and means operative by the travel of the shuttle to move the beater arm across the cables and through the shed.

21. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, means to pass the shuttle through the shed formed by the threads during the rotation of the disks, a beater arm pivotally mounted on the shuttle, and means operative during the travel of the shuttle to rock the beater arm across the cables and through the shed.

22. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, means to pass the shuttle through the shed formed by the threads during the rotation of the disks, a beater arm pivotally mounted at the delivery point of the shuttle and having a pick beating edge, and means operative during the travel of the shuttle to rock the beater arm to bring its beating edge across the cables at the twisting point.

23. In a loom of the type described, a plurality of disks arranged in parallel relation, holes near the periphery of the disks through which warp threads are passed, means to rotate the disks to impart a cable twist to the several threads from each disk, means to collect the cables in parallel relation, a shuttle, means to pass the shuttle through the shed formed by the threads during the rotation of the disks, a beater arm pivotally mounted at the delivery point of the shuttle and having a pick beating edge, and means operative during the travel of the shuttle to rock the beater arm to bring its beating edge across the cables at the twisting point and to withdraw the beater arm as the shuttle passes out of the shed.

24. In a loom of the type described, a plurality of rotary cards arranged in parallel relation, holes in the cards through which warp threads are passed, means to assemble the cables in parallel relation, a shuttle movable in an arcuate path through the shed formed by the cards, means at the inner end of the shuttle to lay a pick thread between the threads in advance of the point at which the threads issuing from the cards are twisted into cable form, a beater arm carried by the shuttle, and means actuated by the movement of the shuttle to cause the beater arm to move into the shed behind the pick.

25. In a loom of the type described, a plurality of rotary cards arranged in parallel relation, holes in the cards through which warp threads are passed, means to assemble the cables in parallel relation, a shuttle movable through the shed formed by the cards, means at the inner end of the shuttle to lay a pick thread between the threads in advance of the point at which the threads issuing from the cards are twisted into cable form, and a beater passing through the shed to align the pick thread and the several twists across the cables.

26. In a loom of the type described, a plurality of rotary cards arranged in parallel relation, holes in the cards through which warp threads are passed, means to assemble the cables in parallel relation, a shuttle movable through the shed formed by the cards, means at the inner end of the shuttle to lay a pick thread between the threads in advance of the point at which the threads issuing from the cards are twisted into cable form, and a beater mounted on the shuttle and movable across the shed during the pick laying operation.

27. In a loom of the type described, a plurality of rotary cards arranged in parallel relation, holes in the cards through which warp threads are passed, means to assemble the cables in parallel relation, a shuttle movable through the shed formed by the cards, means at the inner end of the shuttle to lay a pick thread between the threads in advance of the point at which the threads issuing from the cards are twisted into cable form, and a beater pivotally mounted at the delivery end of the shuttle, said beater being rocked by the shuttle movement so as to enter the shed during the pick laying operation.

28. A loom as set forth in claim 24 provided with means to retard the rotation of the cards during the period that the shuttle is passing across the shed.

29. A loom as set forth in claim 25 provided with means to retard the rotation of the cards during the period that the shuttle is passing across the shed.

30. A loom as set forth in claim 26 provided with means to retard the rotation of the cards during the period that the shuttle is passing across the shed.

31. A loom as set forth in claim 27 provided with means to retard the rotation of the cards during the period that the shuttle is passing across the shed.

32. In a loom of the type described, a plurality of rotary cards, holes in the cards through which warp threads are passed, means to assemble the cables thus formed in parallel relation, pick laying means to insert a pick through the cables during the twisting operation, and a guide for the fabric comprising means to hold and space the cables during the weaving operation.

33. In a loom of the type described, a plurality of rotary cards, holes in the cards through which warp threads are passed, means to assemble the cables thus formed in parallel relation, pick laying means to insert a pick through the cables during the twisting operation, and a guide for the fabric comprising toothed bars which engage the cables to guide them during the weaving operation.

34. In a loom including a rotary card provided with holes through which warp threads are passed, a creel from which the warp threads are supplied, means associated with the creel to remove the twist from the warp threads ahead of the card, means to lay a pick thread through the cable beyond the card, and a guide constituting a relatively stationary delivery point for the threads between the creel and the card, said guide being located in alignment with the axis of the card and the pick laying point.

35. In a loom including a rotary card provided with holes through which warp threads are passed, a creel from which the warp threads are supplied, means associated with the creel to remove the twist from the warp threads ahead of the card, and means for maintaining tension on the threads, during the rotation of the card.

36. A loom in accordance with claim 35 provided with a plurality of cards arranged in parallel relation.

37. A loom including a plurality of rotary cards arranged in parallel relationship, each card being provided with a plurality of holes through which warp threads are passed, a creel from which the threads are supplied, said creel including rotary spool holders, positive driving connections betweeen the cards and the spool holders to remove the twist from the threads ahead of the cards and means for maintaining the threads under tension during the twisting operation.

38. In a loom of the character described, a plurality of parallel rotary cards, each card being provided with a plurality of holes through which warp threads are passed, means to rotate the cards to twist the warp threads into cables, and a beater arranged to enter the shed formed by the rotating cards to bring the twists in the several cables into alignment.

39. In a loom of the character described, a plurality of parallel rotary cards, each card being provided with a plurality of holes through which warp threads are passed, means to rotate the cards to twist the warp threads into cables, means to lay a pick through the cables, and a beater arranged to enter the shed formed by the rotating cards to bring the twists in the several cables into alignment.

40. In a loom of the type described, a rotating disk, holes near the periphery of the disk through which warp threads are passed, means to rotate the disk to impart a cable twist to the several threads, means to tighten the twist in the cable comprising a beater, means to pass the beater through the shed formed by the threads during the rotation of the disk, and means to lay a pick thread through the shed.

STERLING W. ALDERFER.